(12) United States Patent
Wang et al.

(10) Patent No.: US 11,277,873 B2
(45) Date of Patent: Mar. 15, 2022

(54) METHODS AND NODES FOR FACILITATING NON-IP UE-TO-UE COMMUNICATIONS

(71) Applicant: Telefonaktiebolaget LM Ericsson (PUBL), Stockholm (SE)

(72) Inventors: Junjun Wang, Guangdong (CN); Jingrui Tao, Guangdong (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/972,418

(22) PCT Filed: Jun. 8, 2018

(86) PCT No.: PCT/CN2018/090466
§ 371 (c)(1),
(2) Date: Dec. 4, 2020

(87) PCT Pub. No.: WO2019/232795
PCT Pub. Date: Dec. 12, 2019

(65) Prior Publication Data
US 2021/0368558 A1    Nov. 25, 2021

(51) Int. Cl.
*H04W 76/11* (2018.01)
*H04W 12/08* (2021.01)

(52) U.S. Cl.
CPC ............ *H04W 76/11* (2018.02); *H04W 12/08* (2013.01)

(58) Field of Classification Search
CPC .............................. H04W 76/11; H04W 12/08
See application file for complete search history.

(56) References Cited

U.S. PATENT DOCUMENTS

| 2017/0318570 | A1* | 11/2017 | Shaw ..................... G06F 9/5005 |
| 2019/0007329 | A1* | 1/2019 | Velev .................... H04L 47/266 |
| 2019/0141081 | A1* | 5/2019 | Kunz .................... H04W 12/08 |

FOREIGN PATENT DOCUMENTS

| EP | 3 306 959 A1 | 4/2018 |
| WO | 2017 102748 A1 | 6/2017 |
| WO | 2017 119802 A1 | 7/2017 |

(Continued)

OTHER PUBLICATIONS

3GPP TS 23.682 v15.4.0; Technical Specification; 3rd Generation Partnership Project; Technical Specification Group Services and System Aspects; Architecture enhancements to facilitate communications with packet data networks and applications (Release 15)—Mar. 2018.

(Continued)

*Primary Examiner* — Wayne H Cai
(74) *Attorney, Agent, or Firm* — Baker Botts, LLP

(57) ABSTRACT

A method (400) in an SCEF node for facilitating non-IP UE-to-UE communications is provided. The method (400) includes: receiving (420) from a first MME/SGSN associated with a source UE a Create SCEF Connection Request containing an identity of the source UE and an identity of a destination UE; receiving (430) from the first MME/SGSN an MO NIDD Submit Request containing the identity of the source UE and a non-IP data from the source UE; and transmitting (440) an MT NIDD Submit Request containing the non-IP data to a second MME/SGSN associated with the destination UE.

20 Claims, 10 Drawing Sheets

(56) References Cited

FOREIGN PATENT DOCUMENTS

WO  2019 232795 A1  12/2019

OTHER PUBLICATIONS

Extended European Search Report issued for Application No./Patent No. 18921820.9-1218 / 3804407 PCT/CN2018090466—dated May 10, 2021.
3GPP TSG-SA WG2 Meeting #126; Montreal, Canada; Change Request; Title: Group NIDD Configuration; Source to WG: Ericsson; Source to TSG: SA2 (S2-181910)—Feb. 26-Mar. 2, 2018.
3GPP TS 23.682 v15.3.0; Technical Specification; 3rd Generation Partnership Project; Technical Specification Group Services and System Aspects; Architecture enhancements to facilitate communications with packet data networks and applications (Release 15)—Dec. 2017.
3GPP TS 24.008 v15.1.0; Technical Specification; 3rd Generation Partnership Project; Technical Specification Group Core Network and Terminals; Mobile radio interface Layer 3 specification; Core network protocols; Stage 3 (Release 15)—Dec. 2017.
3GPP TS 29.122 v.0.4.0; 3rd Generation Partnership Project; Technical Specification Group Core Network and Terminals; T8 reference point for Northbound APIs (Release 15)—Dec. 2017.
3GPP TS 29.122 v0.4.0; 3rd Generation Partnership Project; Technical Specification Group Core Network and Terminals; T8 reference point for Northbound APIs (Release 15) (marked)—Dec. 2017.
3GPP TS 24.250 v15.0.0; 3rd Generation Partnership Project; Technical Specification Group Core Network and Terminals; Protocol for Reliable Data Service between UE and SCEF; Stage 3 (Release 15)—Dec. 2017.
PCT Notification of Transmittal of the Internatinoal Search Report and the Written Opinion of the International Searching Authority, or the Declaration issued for International application No. PCT/CN2018/090466—dated Feb. 27, 2019.
SA WG2 Meeting #117; Kaohsiung City, Taiwan; Change Request; Title: CIoT Data Delivery Service; Source to WG: Convida Wireless; Source to TSG: SA2 (S2-165994 (Revision of S2-165710))—Oct. 17-21, 2016.

* cited by examiner

| Format | \multicolumn{8}{c}{Address and Control Field Bits} | Octet |
|---|---|---|---|---|---|---|---|---|---|
|  | 8 | 7 | 6 | 5 | 4 | 3 | 2 | 1 |  |
| I Format | PD | 0 | A | DI | ADS | N(S) | | | 1 |
|  | N(R) | | | R1 | R2 | R3 | S1 | S2 | 2 |
|  | Source Port | | | | Destination Port | | | | 3 |
|  | Destination UE Indicator | | | | | | | | 4~6 |
| S Format | PD | 1 | 1 | 0 | ADS | A | DI | X | 1 |
|  | N(R) | | | R1 | R2 | R3 | S1 | S2 | 2 |
|  | Source Port | | | | Destination Port | | | | 3 |
|  | Destination UE Indicator | | | | | | | | 4~6 |
| UI Format | PD | 1 | 0 | DI | ADS | N(U) | | | 1 |
|  | Source Port | | | | Destination Port | | | | 2 |
|  | Destination UE Indicator | | | | | | | | 3~5 |
| U Format | PD | 1 | 1 | 1 | ADS | CR | DI | X | 1 |
|  | X | X | X | X | M4 | M3 | M2 | M1 | 2 |
|  | Source Port | | | | Destination Port | | | | 3 |
|  | Destination UE Indicator | | | | | | | | 4~6 |

Fig. 6

METHODS AND NODES FOR FACILITATING NON-IP UE-TO-UE COMMUNICATIONS

PRIORITY

This nonprovisional application is a U.S. National Stage Filing under 35 U.S.C. § 371 of International Patent Application Serial No. PCT/CN2018/090466 filed Jun. 8, 2018 and entitled "METHODS AND NODES FOR FACILITATING NON-IP UE-TO-UE COMMUNICATIONS" which is hereby incorporated by reference in its entirety.

TECHNICAL FIELD

The present disclosure relates to communication technology, and more particularly, to methods and nodes for facilitating non-Internet Protocol (IP) User Equipment (UE)-to-UE communications.

BACKGROUND

Non-IP Data Delivery (NIDD) over Service Capability Exposure Function (SCEF) has been discussed in the 3$^{rd}$ Generation Partnership Project (3GPP) Technical Specification (TS) 23.682, V15.3.0, 2017-12, which is incorporated herein by reference in its entirety. In particular, three procedures related to NIDD over SCEF have been specified:
NIDD configuration procedure;
Mobile Originated (MO) NIDD procedure, for Non-IP Data from a UE to a Service Capability Server/Application Server (SCS/AS); and
Mobile Terminated (MT) NIDD procedure, for Non-IP Data from an SCS/AS to a UE.

FIG. 1 shows an NIDD configuration procedure. As shown, at 101, an SCS/AS sends an NIDD Configuration Request (including External Identifier or Mobile Station Integrated Services Digital Network Number (MSISDN), SCS/AS Identifier, T8 Transaction Reference ID (TTRI), NIDD Duration, T8 Destination Address, T8 Long Term Reference ID (TLTRI), Requested Action, Packet Data Network (PDN) Connection Establishment Option, Reliable Data Service Configuration) message to an SCEF. T8 Destination Address is an optional parameter included by the SCS/AS to indicate that the non-IP data is to be delivered to an address different from the address of the requesting SCS/AS. At 102, if the request is for a new NIDD configuration, the SCEF stores the External Identifier or MSISDN, TLTRI, SCS/AS Identifier, T8 Destination Address, PDN Connection Establishment Option, and NIDD Duration. At 103, the SCEF sends an NIDD Authorization Request message to a Home Subscriber Server (HSS) for authorization of the NIDD configuration request. At 104, the HSS examines the NIDD Authorization Request message. At 105, the HSS sends an NIDD Authorization Response message to the SCEF to acknowledge acceptance of the NIDD Authorization Request. At 106, the SCEF sends an NIDD Configuration Response (including TTRI, Maximum Packet Size, Reliable Data Service Indication, and Cause) message to the SCS/AS to acknowledge acceptance of the NIDD Configuration Request. If the NIDD Configuration is accepted, the SCEF will create an association between the TLTRI, External Identifier or MSISDN, International Mobile Station Identity (IMSI), and EPS Bearer Identity (EBI) of the non-IP PDN Connection. In the MT NIDD procedure, the SCEF will use TLTRI and External Identifier or MSISDN to determine the IMSI and EBI of the non-IP PDN Connection. In the MO NIDD procedure, the SCEF will use the IMSI and EBI to obtain the TLTRI, External Identifier or MSISDN. For further details, reference can be made to Section 5.13.2, NIDD Configuration, 3GPP TS 23.682, V15.3.0, 2017-12.

FIG. 2 shows an MO NIDD procedure. As shown, at 201, a UE sends non-IP data to a Mobility Management Entity (MME) or Serving GPRS Support Node (SGSN). At 202, the MME/SGSN sends an NIDD Submit Request message to the SCEF (or Interworking SCEF (IWK-SCEF) which forwards the message to the SCEF in the roaming case). At 203, when the SCEF receives the non-IP data, and finds an SCEF Evolved Packet System (EPS) bearer context and the related T8 Destination Address, then it sends the non-IP data to the SCS/AS that is identified by the T8 Destination address in an MO NIDD Indication. At 204, the SCS/AS responds to the SCEF with an MO NIDD Acknowledgement. At 205, the SCEF sends an NIDD Submit Response to the MME/SGSN (or IWK-SCEF which forwards the message to the SCEF in the roaming case). For further details, reference can be made to Section 5.13.4, Mobile Originated NIDD procedure, 3GPP TS 23.682, V15.3.0, 2017-12.

FIG. 3 shows an MT NIDD procedure. As shown, at 301, the SCS/AS sends an MT NIDD Submit Request (including External Identifier or MSISDN, TTRI, TLTRI, non-IP data, Reliable Data Service Configuration, Maximum Latency, Priority, PDN Connection Establishment Option) message to the SCEF. At 302a, if an SCEF EPS bearer context corresponding to the External Identifier or MSISDN included in step 301 is found, then the SCEF checks whether the SCS/AS is authorized to send NIDD requests and that the SCS/AS has not exceeded the quota or rate of data submission to the SCEF EPS bearer. At 303, if an SCEF EPS bearer context corresponding to the External Identifier or MSISDN included in step 1 is found, then the SCEF sends a NIDD Submit Request message toward the MME/SGSN (via IWK-SCEF in the roaming case). At 308, the MME/SGSN delivers the non-IP data to the UE. At 309, the MME/SGSN sends a NIDD Submit Response message towards the SCEF acknowledging the NIDD Submit Request from SCEF. At 310, the SCEF sends an MT NIDD Submit Response to the SCS/AS. For further details of these steps and optional steps 302b, 304, 305, 306 and 307, reference can be made to Section 5.13.3, Mobile Terminated NIDD procedure, 3GPP TS 23.682, V15.3.0, 2017-12.

SUMMARY

It is an object of the present disclosure to provide methods and nodes for facilitating non-IP UE-to-UE communications.

According to a first aspect of the present disclosure, a method in an SCEF node for facilitating non-IP UE-to-UE communications is provided. The method includes receiving from a first Mobility Management Entity (MME)/Serving GPRS Support Node (SGSN) associated with a source UE a Create SCEF Connection Request containing an identity of the source UE and an identity of a destination UE; and receiving from the first MME/SGSN a Mobile Originated (MO) Non-IP Data Delivery (NIDD) Submit Request containing the identity of the source UE and a non-IP data from the source UE. The method also includes transmitting a Mobile Terminated (MT) NIDD Submit Request containing the non-IP data to a second MME/SGSN associated with the destination UE.

In an embodiment, the method may further include receiving from an SCS/AS an NIDD configuration request containing a list of identities of UEs for non-IP UE-to-UE communications.

In an embodiment, the method may further include verifying that the SCS/AS is authorized to configure non-IP UE-to-UE communications.

In an embodiment, the method may further include, subsequent to receiving the Create SCEF Connection Request, creating an SCEF Evolved Packet System (EPS) bearer context for the source UE when the identity of the source UE and the identity of the destination UE are both included in the list.

In an embodiment, the method may further include, subsequent to receiving the Create SCEF Connection Request, associating the identity of the source UE with the identity of the destination UE; and subsequent to receiving the MO NIDD Submit Request: determining the identity of the destination UE associated with the identity of the source UE.

In an embodiment, the MT NIDD Submit Request may be transmitted when an SCEF EPS bearer context for the destination UE is found. The method may further include buffering the non-IP data when no SCEF EPS bearer context for the destination UE is found; and transmitting the buffered non-IP data to the destination UE when the SCEF EPS bearer context for the destination UE is available.

In an embodiment, the identity of the destination UE may be included in an Extended-Protocol Configuration Options (PCO) in a Reliable Data Service (RDS) header in the Create SCEF Connection Request.

In an embodiment, the Create SCEF Connection Request and/or the MO NIDD Submit Request may be received from the first MME/SGSN via an Interworking SCEF (IWK-SCEF) when the source UE is roaming, and/or the MT NIDD Submit Request is transmitted to the second MME/SGSN via an IWK-SCEF when the destination UE is roaming.

According to a second aspect of the present disclosure, an SCEF node is provided. The SCEF node includes a transceiver, a processor and a memory. The memory contains instructions executable by the processor whereby the SCEF node is operative to perform the method according to the above first aspect.

According to a third aspect of the present disclosure, a computer readable storage medium is provided. The computer readable storage medium has computer program instructions stored thereon. The computer program instructions, when executed by a processor in an SCEF node, cause the SCEF node to perform the method according to the above first aspect.

According to a fourth aspect of the present disclosure, a method in an SCS/AS for facilitating non-IP UE-to-UE communications is provided. The method includes: transmitting to an SCEF node a Non-IP Data Delivery (NIDD) configuration request containing a list of identities of UEs for non-IP UE-to-UE communications.

In an embodiment, the list may be common to all UEs for non-IP UE-to-UE communications.

According to a fifth aspect of the present disclosure, an SCS/AS is provided. The SCS/AS includes a transceiver, a processor and a memory. The memory contains instructions executable by the processor whereby the SCS/AS is operative to perform the method according to the above fourth aspect.

According to a sixth aspect of the present disclosure, a computer readable storage medium is provided. The computer readable storage medium has computer program instructions stored thereon. The computer program instructions, when executed by a processor in an SCS/AS, cause the SCS/AS to perform the method according to the above fourth aspect.

According to a seventh aspect of the present disclosure, a method in a User Equipment (UE) for facilitating non-IP UE-to-UE communications is provided. The method includes: transmitting to an MME/SGSN an identity of a destination UE for non-IP UE-to-UE communications in an initial attach procedure, a UE requested Packet Data Network (PDN) connectivity procedure or a Packet Data Protocol (PDP) context activation procedure.

In an embodiment, the identity of the destination UE may be included in an Extended-Protocol Configuration Options (PCO) in a Reliable Data Service (RDS) header.

According to an eighth aspect of the present disclosure, a User Equipment (UE) is provided. The UE includes a transceiver, a processor and a memory. The memory contains instructions executable by the processor whereby the UE is operative to perform the method according to the above seventh aspect.

According to a ninth aspect of the present disclosure, a computer readable storage medium is provided. The computer readable storage medium has computer program instructions stored thereon. The computer program instructions, when executed by a processor in a User Equipment (UE), cause the UE to perform the method according to the above seventh aspect.

With the embodiments of the present disclosure, an SCEF node can receive from a first MME/SGSN associated with a source UE a Create SCEF Connection Request containing an identity of the source UE and an identity of a destination UE. Then, when the SCEF node receives from the first MME/SGSN an MO NIDD Submit Request containing the identity of the source UE and a non-IP data from the source UE, it can transmit an MT NIDD Submit Request containing the non-IP data to a second MME/SGSN associated with the destination UE. In this way, non-IP data can be communicated from the source UE to the destination UE in an efficient manner.

BRIEF DESCRIPTION OF THE DRAWINGS

The above and other objects, features and advantages will be more apparent from the following description of embodiments with reference to the figures, in which:

FIG. 6 is a schematic diagram showing a format of an Address and Control field in an RDS header;

DETAILED DESCRIPTION

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 2:
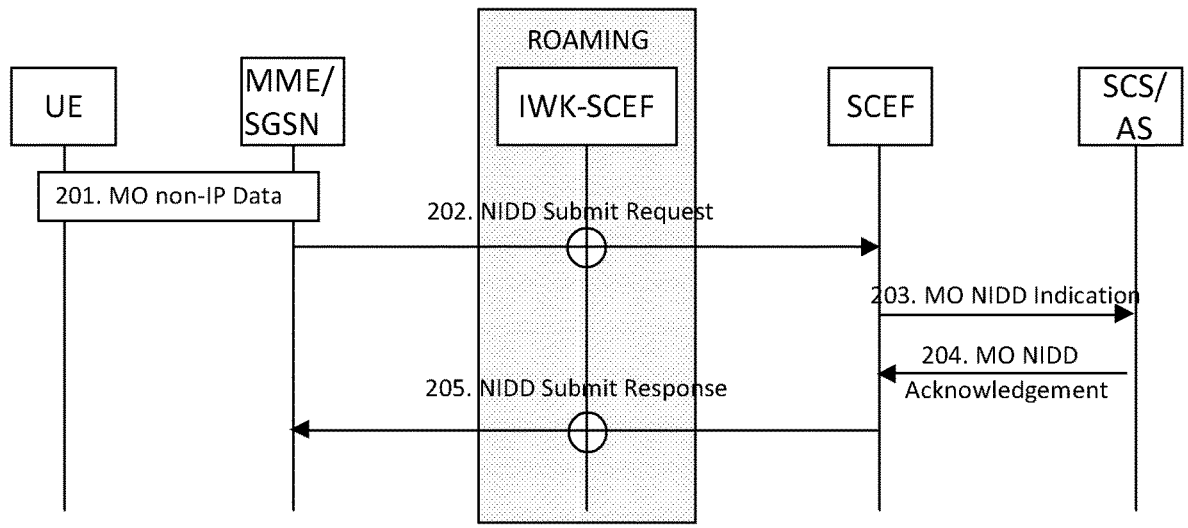
FIG. 2 is a schematic diagram showing an MO NIDD procedure.
Figure 3:
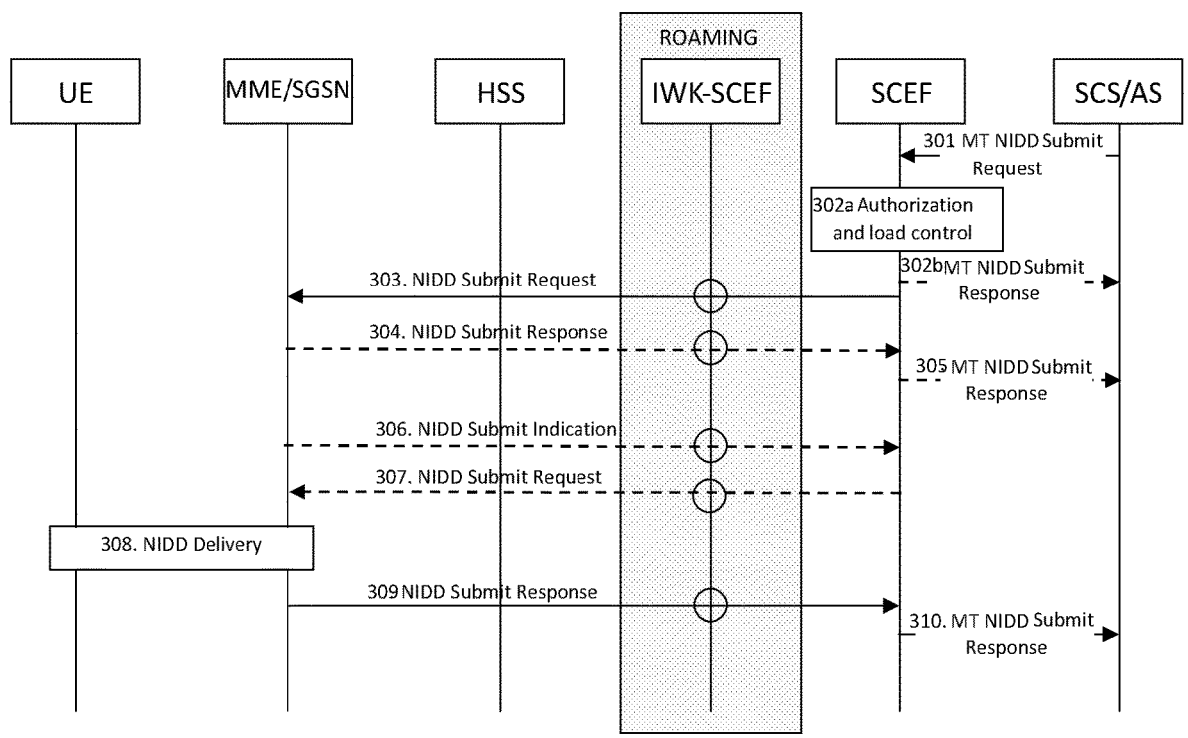
FIG. 3 is a sequence diagram showing an MT NIDD procedure.

It is desirable to enable UE-to-UE, or Device-to-Device (D2D), communications, particularly in Narrow Band-Internet of Things (NB-IoT) scenarios. For example, it is desirable that an IoT low power consumption device can communicate with a neighboring device locally in an efficient manner. However, there is currently no procedure designed for non-IP UE-to-UE communications in 3GPP specifications. According to the 3GPP TS 23.682, V15.3.0, 2017-12, a procedure for non-IP UE-to-UE communications can be as follows. First, a source UE sends MO non-IP data to an SCS/AS using the MO NIDD procedure. Then the SCS/AS extracts the non-IP Data, waits for a destination UE to wake up if necessary, and then sends the non-IP Data to the destination UE using the MT NIDD procedure. That is, the non-IP Data has to be transferred to the SCS/AS, which introduces additional complexity, latency and security risk. Furthermore, as described above in connection with FIG. 2, the source UE cannot designate which UE is the destination UE when transmitting the MO non-IP data since the MO NIDD procedure provides no mechanism to do so.

Figure 4:
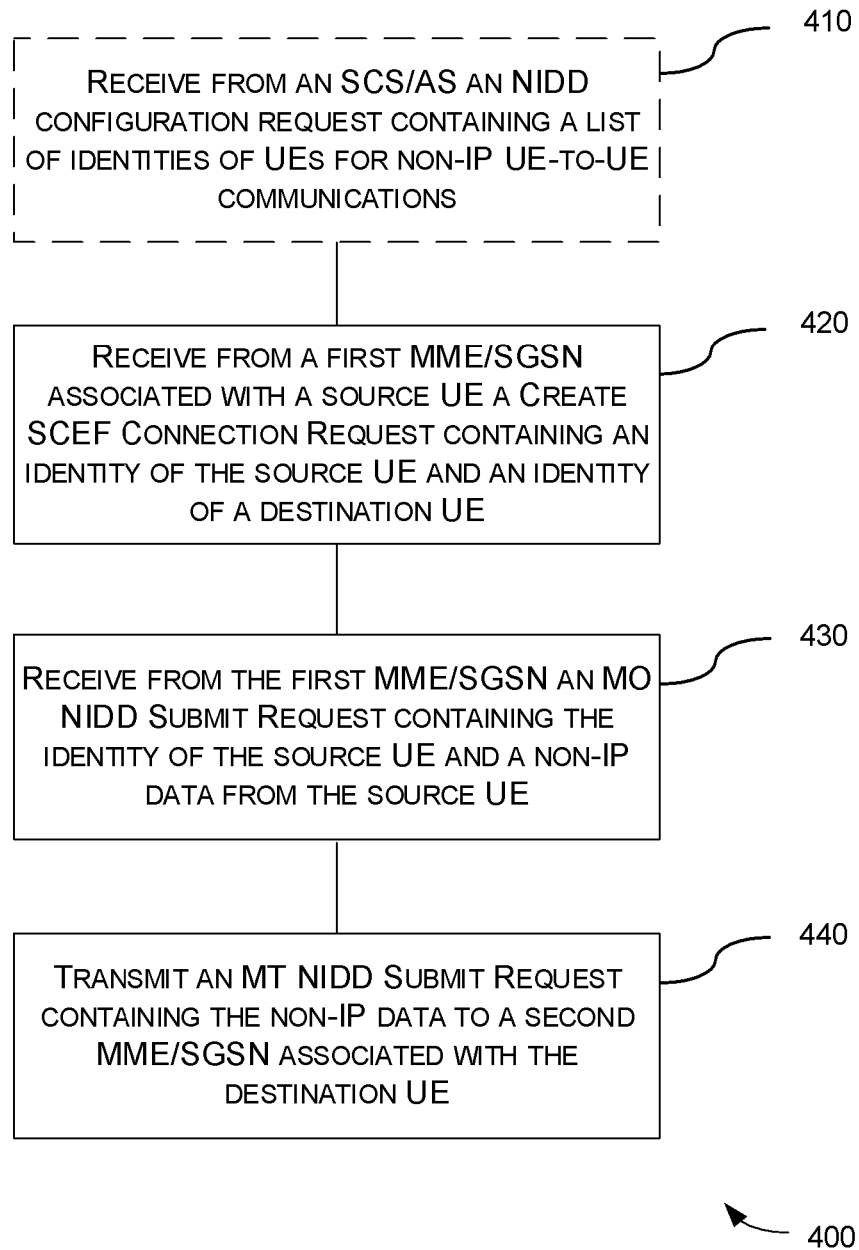
FIG. 4 is a flowchart illustrating a method in an SCEF node for facilitating non-IP UE-to-UE communications according to an embodiment of the present disclosure.

FIG. 4 is a flowchart illustrating a method 400 for facilitating non-IP UE-to-UE communications according to an embodiment of the present disclosure. The method 400 can be performed at an SCEF node.

Initially, at block 410, the SCEF node can receive an NIDD configuration request from an SCS/AS. The NIDD configuration request contains a list of identities of UEs for non-IP UE-to-UE communications. The UEs in this list are UEs capable of communicating with each other.

The block 410 is only required when the list of UEs for non-IP UE-to-UE communications has not been configured and can be omitted when the list is already available at the SCEF node.

Figure 1:
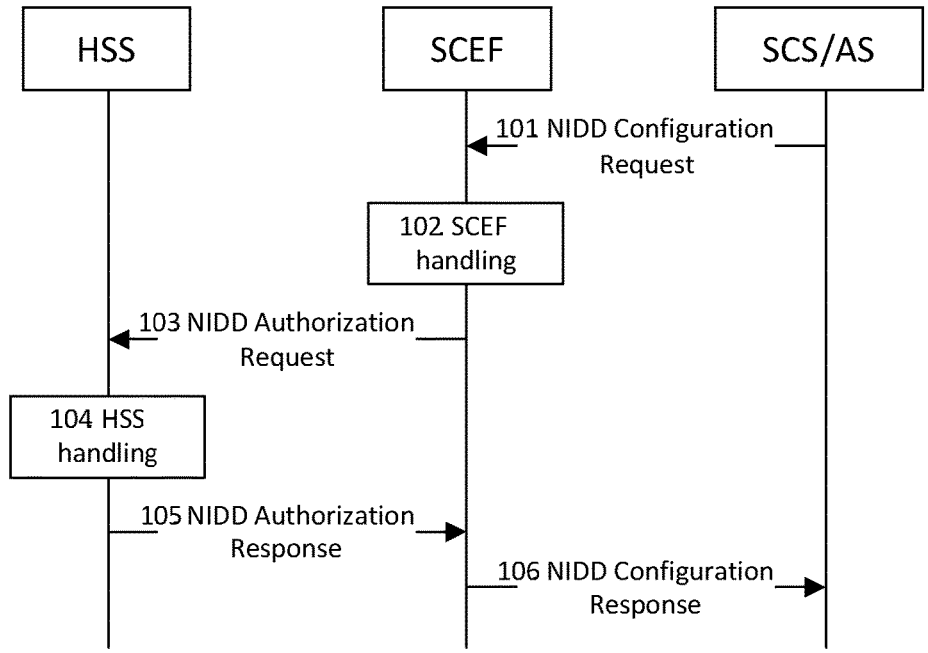
FIG. 1 is a schematic diagram showing an NIDD configuration procedure.
Figure 5:
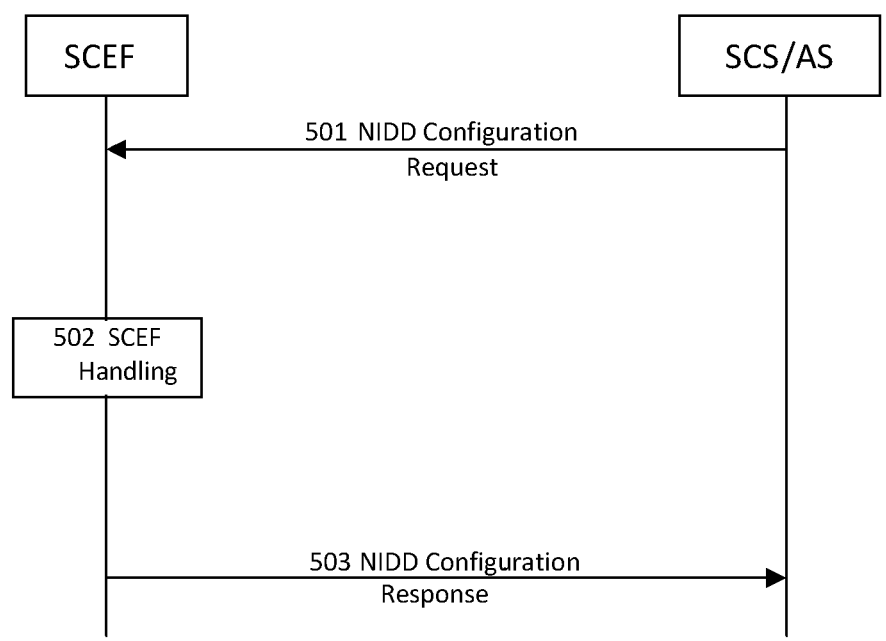
FIG. 5 is a schematic diagram showing an NIDD configuration procedure for UE-to-UE communications.

FIG. 5 shows an NIDD configuration procedure for UE-to-UE communications which can be applied in the block 410. As shown, at 501, the SCEF node receives an NIDD configuration request from the SCS/AS. The NIDD configuration request may include SCS/AS Identifier, TTRI, NIDD Duration, TLTRI, Requested Action, PDN Connection Establishment Option and Reliable Data Service Configuration, as in the step 101 of FIG. 1. In addition, a new field can be introduced to carry the list of identities of UEs for non-IP UE-to-UE communications, referred to as e.g., Destination UE Identity List. The identities of UEs can be an external identifier or an MSISDN. For example, the value of the field can be as follows:

```
"Destination-UE-Identity-List":
    {
        "type": "array",
        "items": {"type": "Destination-UE-Identity"}
    }
"Destination-UE-Identity":
    {
        "type": "object",
        "Properties":
        {
            "Indicator": {"type": "integer"},
            "External-Identifier": {"type": "string"},
            "MSISDN": {"type": "string"},
            "APN": {"type": "string"}
        }
    }
"Destination-UE-Identity-List":[
    {"Indicator": 0,
        "MSISDN": "460000001",
        "APN": "NET"
    },
    {"Indicator": 1,
        "MSISDN": "460000001",
        "APN": "WAP"
    },
    {"Indicator": 2,
        "MSISDN": "460000002",
        "APN": "NET"
    },
    {"Indicator": 4,
        "External-Identifier": "100001@test1.com",
        "APN": "NET"
    },
    {"Indicator": 5,
        "External-Identifier": "100001@test2.com",
        "APN": "NET"
    }
]
```

At 502, the SCEF node verifies that the SCS/AS is authorized to configure non-IP UE-to-UE communications, e.g., based on policies, if it is allowed by SLA, or if the NIDD Configuration Request is malformed. If the SCS/AS is authorized, the SCEF node stores the Destination UE Identity List.

At 503, the SCEF node sends an NIDD Configuration Response (TTRI, Maximum Packet Size, Reliable Data Service Indication, and Cause) message to the SCS/AS to acknowledge acceptance of the NIDD Configuration Request.

Turning back to FIG. 4, at block 420, the SCEF node receives from a first MME/SGSN associated with a source UE a Create SCEF Connection Request containing an identity of the source UE and an identity of a destination UE. In an example, then SCEF node can then associate the identity of the source UE with the identity of the destination UE. The association, once created, can be reused subsequently, e.g., upon receiving one or more subsequent MO NIDD Submit Requests.

In an example, the identity of the destination UE can be included in an Extended-Protocol Configuration Options (PCO) in a Reliable Data Service (RDS) header in the Create SCEF Connection Request. The RDS protocol is specified in 3GPP TS 24.250, V15.0.0, 2017-12, which is incorporated herein by reference in its entirety. The RDS establishes a peer-to-peer logical link between the UE and the SCEF. The RDS supports peer-to-peer data transfer and shall provide reliable data delivery between the UE and the SCEF. To indicate the identity of the destination UE, a new field, Destination UE Indicator, can be introduced in the RDS header (particularly in the Address and Control field), as shown in FIG. 6. The Destination UE Indicator contains three octets, having its value ranging from 0 to 16,777,215. The Destination UE Indicator is used by the source UE to indicate to the SCEF node to which UE (destination UE) the non-IP data is to be transmitted. A Destination Indicator (DI) bit can also be introduced in the RDS header, indicating the presence/absence of the Destination UE Indicator in the RDS header. For further details of other fields in the RDS header, reference can be made to 3GPP TS 24.250, V15.0.0, 2017-12.

Figure 7:
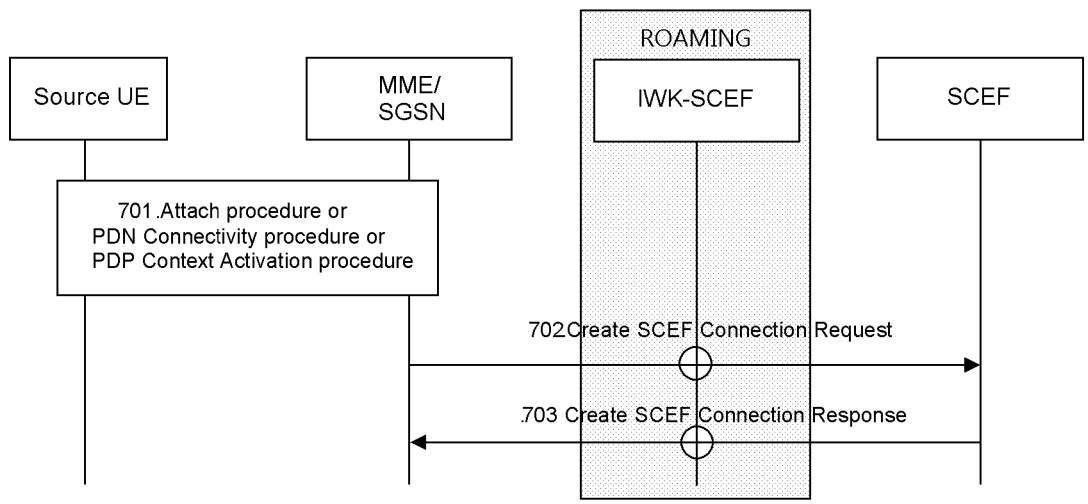
FIG. 7 is a schematic diagram showing a T6a/T6b Connection Establishment procedure for UE-to-UE communications.

FIG. 7 shows a T6a/T6b Connection Establishment procedure which can be applied in the block 420. As shown, at 701, the source UE transmits the identity of the destination UE (e.g., in the above Destination UE Indicator) to the first MME/SGSN in an initial attach procedure, a UE requested Packet Data Network (PDN) connectivity procedure or a Packet Data Protocol (PDP) context activation procedure. At 702, the first MME/SGSN sends a Create SCEF Connection Request, containing the Destination UE Indicator, to the SCEF node (via an IWK-SCEF node when the source UE is roaming). The Destination UE Indicator can be embedded in a diameter Attribute-Value Pair (AVP), Extended-PCO. The Extended-PCO is sent in EPS Session Management signaling between the source UE and the MME or in GPRS Session Management signaling between the UE and the SGSN. The information in the Extended-PCO can pass transparently through the first MME/SGSN. The Extended-PCO can be a type 6 information element with a minimum length of 4 octets and a maximum length of 65,538 octets and can be coded according to 3GPP TS 24.008, V15.1.0, 2017-12, which is incorporated herein by reference in its entirety. Then, the SCEF node decodes the Extended-PCO and obtains the Destination UE Indicator. The SCEF nodes checks if the identities of both the source UE and the destination UE are both included in the Destination UE Identity List received in the block 410. That is, the SCEF node checks if the both UEs have already been activated by the SCS/AS to use the NIDD service via the NIDD Configuration procedure and verifies if the SCS/AS has already processed the NIDD UE-to-UE configuration. If so, the SCEF node creates an SCEF EPS Bearer Context for source UE and sends, at 703, a Create SCEF Connection Response to the first MME/SGSN (via an IWK-SCEF node when the source UE is roaming), acknowledging establishment of the PDN connection. Otherwise the SCEF node rejects the connection establishment setup with an appropriate cause.

Turning back to FIG. 4, at block 430, the SCEF node receives from the first MME/SGSN a Mobile Originated (MO) NIDD Submit Request containing the identity of the source UE and a non-IP data from the source UE. In an example, the SCEF node can then determine the identity of the destination UE associated with the identity of the source UE.

At block 440, the SCEF node transmits a Mobile Terminated (MT) NIDD Submit Request containing the non-IP data to a second MME/SGSN associated with the destination UE.

Figure 8:
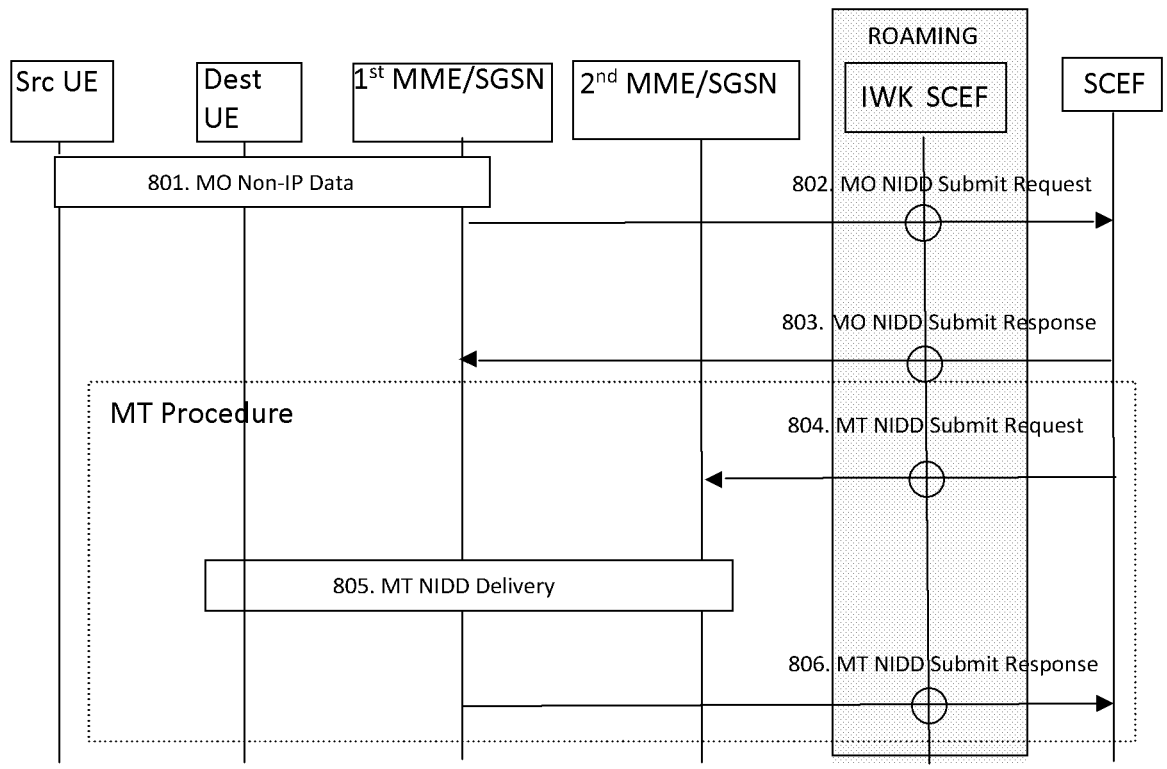
FIG. 8 is a schematic diagram showing an MO-MT procedure for UE-to-UE communications.

FIG. 8 shows an MO-MT procedure which can be applied in the blocks 430 and 440. As shown, at 801, the source UE sends a Non-Access Stratum (NAS) message containing an EPS bearer ID and non-IP data to the first MME/SGSN. At 802, the first MME/SGSN sends an MO NIDD Submit Request (source UE Identity, EBI, SCEF ID, non-IP data, etc.) to the SCEF node (via an IWK-SCEF node when the source UE is roaming). When the SCEF node receives the non-IP data on the T6a/T6b (or T7) interface and finds a SCEF EPS bearer context of the source UE and the identity of the destination UE which is provided in the T6a/T6b Connection Establishment procedure for the source UE, at 803, the SCEF node sends an MO NIDD Submit Response to the first MME/SGSN with a success code (via an IWK-SCEF node when the source UE is roaming). At 804, if an SCEF EPS bearer context for the destination UE is found (and if the destination UE is awake), the SCEF node triggers an MT procedure and sends an MT NIDD Submit Request (Destination User IMSI, destination EPS Bearer ID, SCEF ID, non-IP data, SCEF Wait Time, Maximum Re-transmission time) message to the second MME/SGSN (via an IWK-SCEF node when the destination UE is roaming). If the EPS bearer context for the destination UE is not found (or the destination UE is sleeping, e.g., in a Power Saving Mode), the SCEF node can buffer the non-IP data and transmit the buffered non-IP data to the destination UE when the SCEF EPS bearer context for the destination UE is available (and the destination UE is awake). At 805, the second MME/SGSN sends the non-IP Data to the destination UE. At 806, the second MME/SGSN sends an MT NIDD Submit Response to the SCEF node (via an IWK-SCEF node when the destination UE is roaming), acknowledging the MT NIDD Submit Request.

Figure 9:
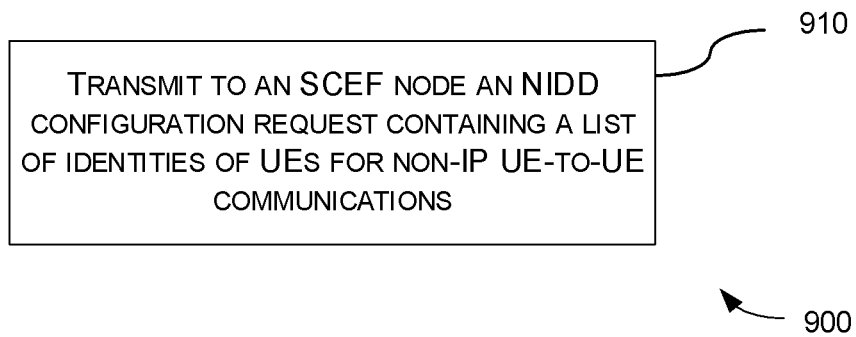
FIG. 9 is a flowchart illustrating a method in an SCS/AS for facilitating non-IP UE-to-UE communications according to an embodiment of the present disclosure.

FIG. 9 is a flowchart illustrating a method 900 for facilitating non-IP UE-to-UE communications according to an embodiment of the present disclosure. The method 900 can be performed at an SCS/AS.

At block 910, the SCS/AS transmits to an SCEF node an NIDD configuration request containing a list of identities of UEs for non-IP UE-to-UE communications. This action is related to the block 410 in FIG. 4 and the step 501 in FIG. 5.

In an example, the list can be common to all UEs for non-IP UE-to-UE communications.

Figure 10:
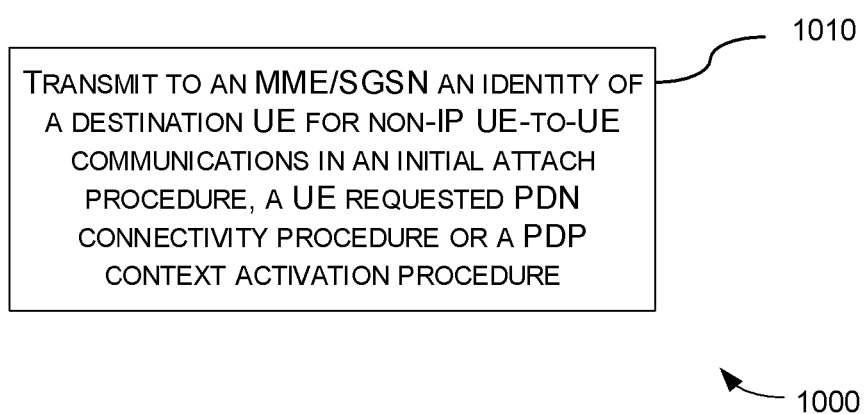
FIG. 10 is a flowchart illustrating a method in a UE for facilitating non-IP UE-to-UE communications according to an embodiment of the present disclosure.

FIG. 10 is a flowchart illustrating a method 1000 for facilitating non-IP UE-to-UE communications according to an embodiment of the present disclosure. The method 1000 can be performed at a UE.

At block 1010, the UE transmits to an MME/SGSN an identity of a destination UE for non-IP UE-to-UE communications in an initial attach procedure, a UE requested Packet Data Network (PDN) connectivity procedure or a Packet Data Protocol (PDP) context activation procedure. This action is related to the step 701 in FIG. 7.

In an example, the identity of the destination UE is included in an Extended-PCO in an RDS header.

Figure 11:
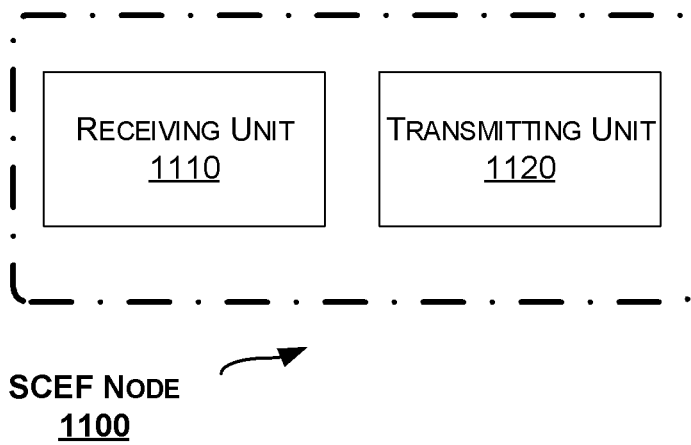
FIG. 11 is a block diagram of an SCEF node according to an embodiment of the present disclosure.

Correspondingly to the method 400 as described above, an SCEF node is provided. FIG. 11 is a block diagram of an SCEF node 1100 according to an embodiment of the present disclosure. The SCEF node 1100 can facilitate non-IP UE-to-UE communications.

As shown in FIG. 11, the SCEF node 1100 includes a receiving unit 1110 configured to receive from a first MME/SGSN associated with a source UE a Create SCEF Connection Request containing an identity of the source UE and an identity of a destination UE. The receiving unit 1100 is further configured to receive from the first MME/SGSN an MO NIDD Submit Request containing the identity of the source UE and a non-IP data from the source UE. The SCEF node 1100 can further include a transmitting unit 1120 configured to transmit an MT NIDD Submit Request containing the non-IP data to a second MME/SGSN associated with the destination UE.

In an embodiment, the receiving unit 1100 can further be configured to receive from an SCS/AS an NIDD configuration request containing a list of identities of UEs for non-IP UE-to-UE communications.

In an embodiment, the SCEF node 1100 can further include a verifying unit configured to verify that the SCS/AS is authorized to configure non-IP UE-to-UE communications.

In an embodiment, the SCEF node 1100 can further include a creating unit configured to create, subsequent to receiving the Create SCEF Connection Request, an SCEF Evolved Packet System (EPS) bearer context for the source UE when the identity of the source UE and the identity of the destination UE are both included in the list.

In an embodiment, the SCEF node 1100 can further include an associating unit configured to associate, subsequent to receiving the Create SCEF Connection Request, the identity of the source UE with the identity of the destination UE. The SCEF node 1100 can further include a determining unit configured to determining, subsequent to receiving the MO NIDD Submit Request, the identity of the destination UE associated with the identity of the source UE.

In an embodiment, the MT NIDD Submit Request can be transmitted when an SCEF EPS bearer context for the destination UE is found. The SCEF node 1100 can further include a buffering unit configured to buffer the non-IP data when no SCEF EPS bearer context for the destination UE is found. The transmitting unit 1120 can be further configured to transmit the buffered non-IP data to the destination UE when the SCEF EPS bearer context for the destination UE is available.

In an embodiment, the identity of the destination UE can be included in an Extended-Protocol Configuration Options (PCO) in a Reliable Data Service (RDS) header in the Create SCEF Connection Request.

In an embodiment, the Create SCEF Connection Request and/or the MO NIDD Submit Request can be received from the first MME/SGSN via an Interworking SCEF (IWK-SCEF) when the source UE is roaming, and/or the MT NIDD Submit Request can be transmitted to the second MME/SGSN via an IWK-SCEF when the destination UE is roaming.

The receiving unit 1110 and the transmitting unit 1120 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 4.

Figure 12:
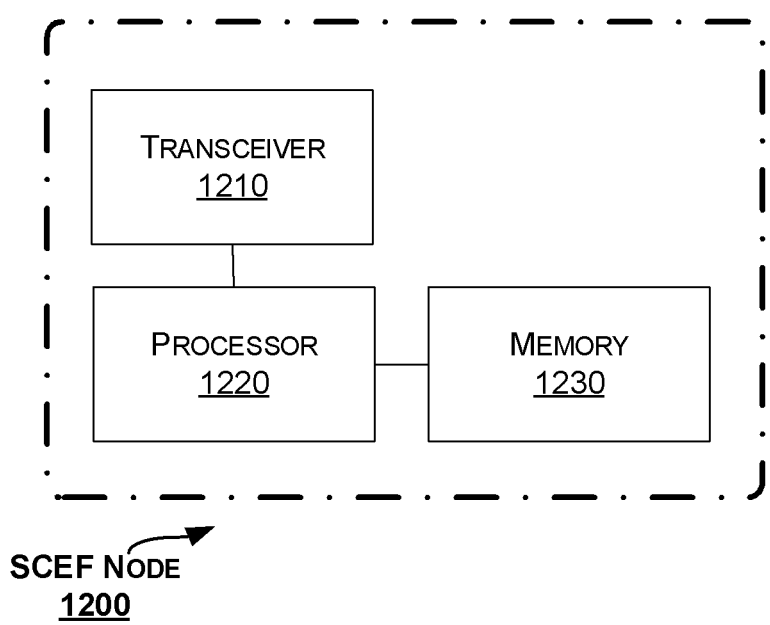
FIG. 12 is a block diagram of an SCEF node according to another embodiment of the present disclosure.

FIG. 12 is a block diagram of an SCEF node 1200 according to another embodiment of the present disclosure. The SCEF node 1200 can facilitate non-IP UE-to-UE communications.

The SCEF node 1200 includes a transceiver 1210, a processor 1220 and a memory 1230. The memory 1230 contains instructions executable by the processor 1220 whereby the SCEF node 1200 is operative to perform the actions, e.g., of the procedure described earlier in conjunction with FIG. 4. Particularly, the memory 1230 contains instructions executable by the processor 1220 whereby the SCEF node 1200 is operative to: receive from a first Mobility Management Entity (MME)/Serving GPRS Support Node (SGSN) associated with a source UE a Create SCEF Connection Request containing an identity of the source UE and an identity of a destination UE; receive from the first MME/SGSN a Mobile Originated (MO) NIDD Submit Request containing the identity of the source UE and a non-IP data from the source UE; and transmit a Mobile Terminated (MT) NIDD Submit Request containing the non-IP data to a second MME/SGSN associated with the destination UE.

In an embodiment, the memory 1230 can further contain instructions executable by the processor 1220 whereby the SCEF node 1200 is operative to: receive from an SCS/AS an NIDD configuration request containing a list of identities of UEs for non-IP UE-to-UE communications.

In an embodiment, the memory 1230 can further contain instructions executable by the processor 1220 whereby the SCEF node 1200 is operative to: verify that the SCS/AS is authorized to configure non-IP UE-to-UE communications.

In an embodiment, the memory 1230 can further contain instructions executable by the processor 1220 whereby the SCEF node 1200 is operative to, subsequent to receiving the Create SCEF Connection Request: create an SCEF Evolved Packet System (EPS) bearer context for the source UE when the identity of the source UE and the identity of the destination UE are both included in the list.

In an embodiment, the memory 1230 can further contain instructions executable by the processor 1220 whereby the SCEF node 1200 is operative to, subsequent to receiving the Create SCEF Connection Request: associate the identity of the source UE with the identity of the destination UE; and subsequent to receiving the MO NIDD Submit Request: determine the identity of the destination UE associated with the identity of the source UE.

In an embodiment, the MT NIDD Submit Request can be transmitted when an SCEF EPS bearer context for the destination UE is found. The memory 1230 can further contain instructions executable by the processor 1220 whereby the SCEF node 1200 is operative to: buffer the non-IP data when no SCEF EPS bearer context for the destination UE is found; and transmit the buffered non-IP data to the destination UE when the SCEF EPS bearer context for the destination UE is available.

In an embodiment, the identity of the destination UE can be included in an Extended-Protocol Configuration Options (PCO) in a Reliable Data Service (RDS) header in the Create SCEF Connection Request.

In an embodiment, the Create SCEF Connection Request and/or the MO NIDD Submit Request can be received from the first MME/SGSN via an Interworking SCEF (IWK-SCEF) when the source UE is roaming, and/or the MT NIDD Submit Request can be transmitted to the second MME/SGSN via an IWK-SCEF when the destination UE is roaming.

Figure 13:
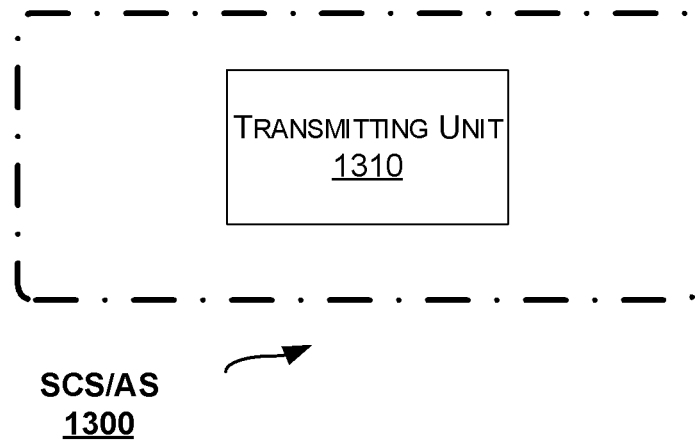
FIG. 13 is a block diagram of an SCS/AS according to an embodiment of the present disclosure.

Correspondingly to the method 900 as described above, an SCS/AS is provided. FIG. 13 is a block diagram of an SCS/AS 1300 according to an embodiment of the present disclosure. The SCS/AS 1300 can facilitate non-IP UE-to-UE communications.

As shown in FIG. 13, the SCS/AS 1300 includes a transmitting unit 1310 configured to transmit to an SCEF node a Non-IP Data Delivery (NIDD) configuration request containing a list of identities of UEs for non-IP UE-to-UE communications.

In an embodiment, the list can be common to all UEs for non-IP UE-to-UE communications.

The transmitting unit 1310 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 9.

Figure 14:
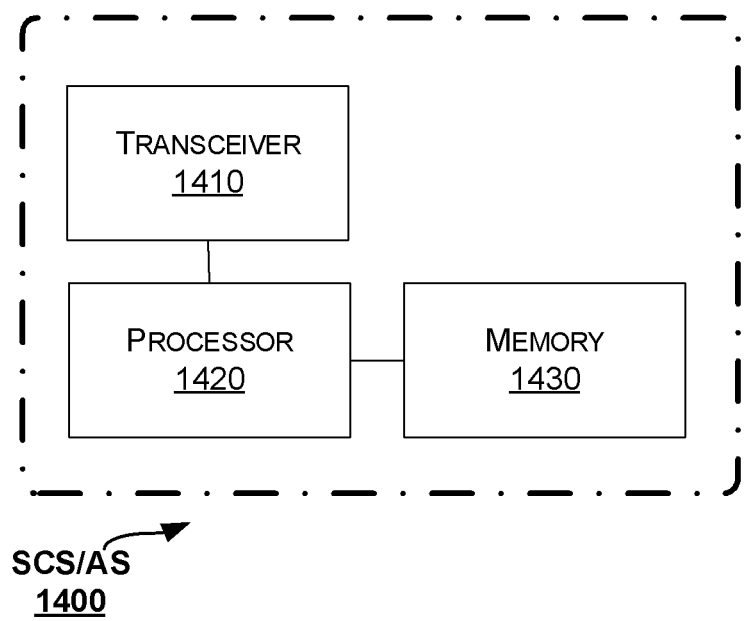
FIG. 14 is a block diagram of an SCS/AS according to another embodiment of the present disclosure.

FIG. 14 is a block diagram of an SCS/AS 1400 according to another embodiment of the present disclosure. The SCS/AS 1400 can facilitate non-IP UE-to-UE communications.

The SCS/AS 1400 includes a transceiver 1410, a processor 1420 and a memory 1430. The memory 1430 contains instructions executable by the processor 1420 whereby the SCS/AS 1400 is operative to perform the actions, e.g., of the procedure described earlier in conjunction with FIG. 9. Particularly, the memory 1430 contains instructions executable by the processor 1420 whereby the SCS/AS 1400 is operative to transmit to an SCEF node a Non-IP Data Delivery (NIDD) configuration request containing a list of identities of UEs for non-IP UE-to-UE communications.

In an embodiment, the list can be common to all UEs for non-IP UE-to-UE communications.

Figure 15:
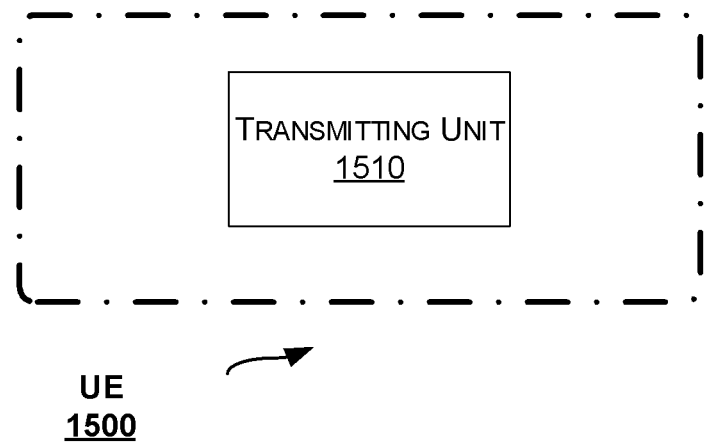
FIG. 15 is a block diagram of a UE according to an embodiment of the present disclosure.

Correspondingly to the method 1000 as described above, a UE is provided. FIG. 15 is a block diagram of a UE 1500 according to an embodiment of the present disclosure. The UE 1500 can facilitate non-IP UE-to-UE communications.

As shown in FIG. 15, the UE 1500 includes a transmitting unit 1510 configured to transmit to an MME/SGSN an identity of a destination UE for non-IP UE-to-UE communications in an initial attach procedure, a UE requested Packet Data Network (PDN) connectivity procedure or a Packet Data Protocol (PDP) context activation procedure.

In an embodiment, the identity of the destination UE can be included in an Extended-Protocol Configuration Options (PCO) in a Reliable Data Service (RDS) header.

The transmitting unit 1510 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 10.

Figure 16:
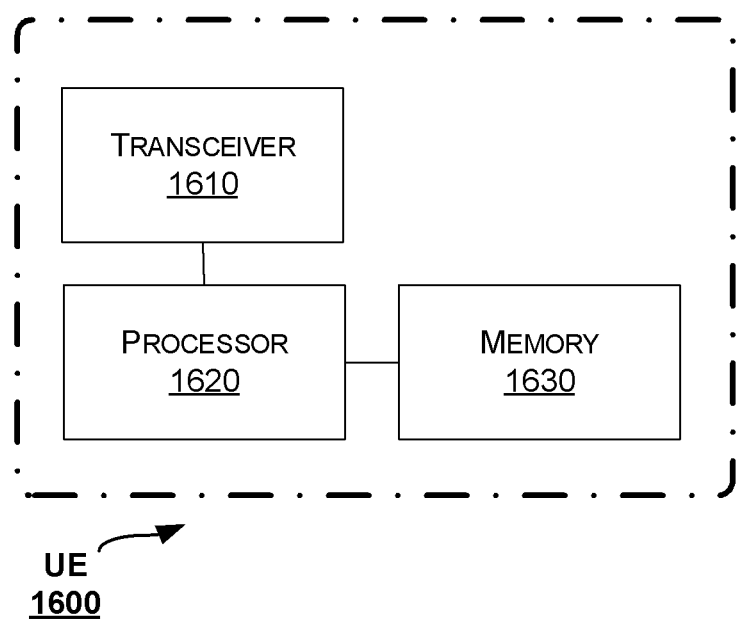
FIG. 16 is a block diagram of a UE according to another embodiment of the present disclosure.

FIG. 16 is a block diagram of a UE 1600 according to another embodiment of the present disclosure. The UE 1600 can facilitate non-IP UE-to-UE communications.

The UE 1600 includes a transceiver 1610, a processor 1620 and a memory 1630. The memory 1630 contains instructions executable by the processor 1620 whereby the UE 1600 is operative to perform the actions, e.g., of the procedure described earlier in conjunction with FIG. 10. Particularly, the memory 1630 contains instructions executable by the processor 1620 whereby the UE 1600 is operative to transmit to an MME/SGSN an identity of a destination UE for non-IP UE-to-UE communications in an initial attach procedure, a UE requested Packet Data Network (PDN) connectivity procedure or a Packet Data Protocol (PDP) context activation procedure.

In an embodiment, the identity of the destination UE can be included in an Extended-Protocol Configuration Options (PCO) in a Reliable Data Service (RDS) header.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1220 causes the SCEF node 1200 to perform the actions, e.g., of the procedure described earlier in conjunction with FIG. 4; or code/computer readable instructions, which when executed by the processor 1420 causes the SCS/AS 1400 to perform the actions, e.g., of the procedure described earlier in conjunction with FIG. 9; or code/computer readable instructions, which when executed by the processor 1620 causes the UE 1600 to perform the actions, e.g., of the procedure described earlier in conjunction with FIG. 10.

The computer program product may be configured as a computer program code structured in computer program modules. The computer program modules could essentially perform the actions of the flow illustrated in FIG. 4, 9 or 10.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a Service Capability Exposure Function, SCEF, node for facilitating non-Internet Protocol, IP, User Equipment, UE,-to-UE communications, comprising:

receiving from a first Mobility Management Entity, MME, /Serving GPRS Support Node, SGSN, associated with a source UE a Create SCEF Connection Request containing an identity of the source UE and an identity of a destination UE;

receiving from the first MME/SGSN a Mobile Originated, MO, Non-IP Data Delivery, NIDD, Submit Request containing the identity of the source UE and a non-IP data from the source UE; and transmitting a Mobile Terminated, MT, NIDD Submit Request containing the non-IP data to a second MME/SGSN associated with the destination UE.

2. The method of claim 1, further comprising:

receiving from a Service Capability Server, SCS, /Application Server, AS, an NIDD configuration request containing a list of identities of UEs for non-IP UE-to-UE communications.

3. The method of claim 2, further comprising:

verifying that the SCS/AS is authorized to configure non-IP UE-to-UE communications.

4. The method of claim 2, further comprising, subsequent to receiving the Create SCEF Connection Request:

creating an SCEF Evolved Packet System, EPS, bearer context for the source UE when the identity of the source UE and the identity of the destination UE are both included in the list.

5. The method of claim 1, further comprising:

subsequent to receiving the Create SCEF Connection Request:

associating the identity of the source UE with the identity of the destination UE; and subsequent to receiving the MO NIDD Submit Request: determining the identity of the destination UE associated with the identity of the source UE.

6. The method of claim 1, wherein the MT NIDD Submit Request is transmitted when an SCEF EPS bearer context for the destination UE is found, and the method further comprises:

buffering the non-IP data when no SCEF EPS bearer context for the destination UE is found; and transmitting the buffered non-IP data to the destination UE when the SCEF EPS bearer context for the destination UE is available.

7. The method of claim 1, wherein the identity of the destination UE is included in an Extended-Protocol Configuration Options, PCO, in a Reliable Data Service, RDS, header in the Create SCEF Connection Request.

8. The method of claim 1, wherein the Create SCEF Connection Request and/or the MO NIDD Submit Request is received from the first MME/SGSN via an Interworking SCEF, IWK-SCEF when the source UE is roaming, and/or the MT NIDD Submit Request is transmitted to the second MME/SGSN via an IWK-SCEF when the destination UE is roaming.

9. A Service Capability Exposure Function, SCEF, node comprising a transceiver, a processor and a memory, the memory comprising instructions executable by the processor whereby the SCEF node, so as to facilitating non-Internet Protocol, IP, User Equipment, UE,-to-UE communications, is operative to:

receive from a first Mobility Management Entity, MME, /Serving GPRS Support Node, SGSN, associated with a source UE a Create SCEF Connection Request containing an identity of the source UE and an identity of a destination UE;

receive from the first MME/SGSN a Mobile Originated, MO, Non-IP Data Delivery, NIDD, Submit Request containing the identity of the source UE and a non-IP data from the source UE; and transmit a Mobile Terminated, MT, NIDD Submit Request containing the non-IP data to a second MME/SGSN associated with the destination UE.

10. The SCEF node of claim 9, wherein the memory further comprises instructions executable by the processor whereby the SCEF node is operative to:

receive from a Service Capability Server, SCS, /Application Server, AS, an NIDD configuration request containing a list of identities of UEs for non-IP UE-to-UE communications.

11. The SCEF node of claim 10, wherein the memory further comprises instructions executable by the processor whereby the SCEF node is operative to:

verify that the SCS/AS is authorized to configure non-IP UE-to-UE communications.

12. The SCEF node of claim 10, wherein the memory further comprises instructions executable by the processor whereby the SCEF node is operative to:

create an SCEF Evolved Packet System, EPS, bearer context for the source UE when the identity of the source UE and the identity of the destination UE are both included in the list.

13. The SCEF node of claim 9, wherein the memory further comprises instructions executable by the processor whereby the SCEF node is operative to:

subsequent to receiving the Create SCEF Connection Request:

associate the identity of the source UE with the identity of the destination UE; and subsequent to receiving the MO NIDD Submit Request: determine the identity of the destination UE associated with the identity of the source UE.

14. The SCEF node of claim 9, wherein the memory further comprises instructions executable by the processor whereby the SCEF node is operative to:

transmit the MT NIDD Submit Request when an SCEF EPS bearer context for the destination UE is found:

buffer the non-IP data when no SCEF EPS bearer context for the destination UE is found; and transmit the buffered non-IP data to the destination UE when the SCEF EPS bearer context for the destination UE is available.

15. The SCEF node of claim 9, wherein the identity of the destination UE is included in an Extended-Protocol Configuration Options, PCO, in a Reliable Data Service, RDS, header in the Create SCEF Connection Request.

16. The SCEF node of claim 9, wherein the Create SCEF Connection Request and/or the MO NIDD Submit Request is received from the first MME/SGSN via an Interworking SCEF, IWK-SCEF when the source UE is roaming, and/or the MT NIDD Submit Request is transmitted to the second MME/SGSN via an IWK-SCEF when the destination UE is roaming.

17. A Service Capability Server, SCS, /Application Server, AS comprising a transceiver, a processor and a memory, the memory comprising instructions executable by the processor whereby the SCS/AS, so as to facilitate non-Internet Protocol, IP, User Equipment, UE,-to-UE communications, is operative to:

transmit to a Service Capability Exposure Function, SCEF, node a Non-IP Data Delivery, NIDD, configuration request containing a list of identities of UEs for non-IP UE-to-UE communications.

18. The SCS/AS of claim 17, wherein the list is common to all UEs for non-IP UE-to-UE communications.

19. A User Equipment, UE, comprising a transceiver, a processor and a memory, the memory comprising instructions executable by the processor whereby the UE, so as to facilitate non-Internet Protocol, IP, UE-to-UE communications, is operative to:
- transmit to a Mobility Management Entity, MME, /Serving GPRS Support Node, SGSN, an identity of a destination UE for non-IP UE-to-UE communications in an initial attach procedure, a UE requested Packet Data Network, PDN, connectivity procedure or a Packet Data Protocol, PDP, context activation procedure.

20. The UE of claim 19, wherein the identity of the destination UE is included in an Extended-Protocol Configuration Options, PCO, in a Reliable Data Service, RDS, header.

* * * * *